(12) United States Patent
Bunazawa et al.

(10) Patent No.: US 11,959,545 B2
(45) Date of Patent: Apr. 16, 2024

(54) VEHICLE CONTROL DEVICE, VEHICLE CONTROL SYSTEM, VEHICLE LEARNING DEVICE, AND VEHICLE LEARNING METHOD

(71) Applicant: TOYOTA JIDOSHA KABUSHIKI KAISHA, Toyota (JP)

(72) Inventors: Hideaki Bunazawa, Nagoya (JP); Atsushi Tabata, Okazaki (JP); Koichi Okuda, Toyota (JP); Ken Imamura, Toyota (JP); Kota Fujii, Nissin (JP); Keita Sasaki, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 427 days.

(21) Appl. No.: 17/329,644

(22) Filed: May 25, 2021

(65) Prior Publication Data

US 2021/0403000 A1     Dec. 30, 2021

(30) Foreign Application Priority Data

Jun. 25, 2020   (JP) ................. 2020-109677

(51) Int. Cl.
 *F16H 59/42*  (2006.01)
 *F16H 61/02*  (2006.01)
 (Continued)

(52) U.S. Cl.
 CPC ........ *F16H 59/42* (2013.01); *F16H 61/0213* (2013.01); *G06N 20/00* (2019.01);
 (Continued)

(58) Field of Classification Search
 CPC ................. G06N 20/00; B60K 6/445; F16H 2061/0087; F16H 2061/009;
 (Continued)

(56) References Cited

U.S. PATENT DOCUMENTS 5,029,086 A * 7/1991 Yoshimura ............ F16H 61/061
 477/65
5,722,913 A    3/1998 Gierer
(Continued)

FOREIGN PATENT DOCUMENTS

DE        44 05 806 A1   8/1995
DE   11 2010 005 964 T5   8/2013
(Continued)

OTHER PUBLICATIONS

Jun. 17, 2022 Notice of Allowance issued in U.S. Appl. No. 17/332,206.
(Continued)

*Primary Examiner* — Carl C Staubach
(74) *Attorney, Agent, or Firm* — Oliff PLC

(57) ABSTRACT

A vehicle control device includes a processor and memory. The memory stores relation-defining data for defining a relation between a state of a vehicle and an action variable that is a variable relating to operations of a transmission installed in the vehicle. The processor is configured to execute acquisition processing, operation processing, reward calculation processing, updating processing, counting processing, and limiting processing. The processor is configured to output the relation-defining data updated so that an expected income is increased when the transmission is operated following the relation-defining data, based on an updating map.

9 Claims, 7 Drawing Sheets

(51) Int. Cl.
    *G06N 20/00*    (2019.01)
    *F16H 59/18*    (2006.01)
    *F16H 61/00*    (2006.01)
    *F16H 61/04*    (2006.01)

(52) U.S. Cl.
    CPC ...... *F16H 59/18* (2013.01); *F16H 2061/0087* (2013.01); *F16H 2061/009* (2013.01); *F16H 2061/0096* (2013.01); *F16H 2061/0459* (2013.01)

(58) Field of Classification Search
    CPC ..... F16H 2061/0096; F16H 2061/0459; F16H 59/18; F16H 59/42; F16H 59/44; F16H 61/0213; F16H 61/686
    See application file for complete search history.

(56) References Cited

U.S. PATENT DOCUMENTS

| | | | |
|---|---|---|---|
| 5,741,203 A * | 4/1998 | Nishio | F16H 61/061 |
| | | | 477/154 |
| 6,259,983 B1 | 7/2001 | Tsutsui et al. | |
| 6,549,815 B1 | 4/2003 | Kaji | |
| 7,357,120 B2 * | 4/2008 | Kaji | F02D 11/105 |
| | | | 123/360 |
| 11,236,819 B1 * | 2/2022 | Fujii | F16H 61/0265 |
| 11,248,553 B2 * | 2/2022 | Hashimoto | G06N 3/006 |
| 11,420,644 B2 * | 8/2022 | Bunazawa | B60W 10/08 |
| 11,421,781 B2 * | 8/2022 | Bunazawa | F16H 61/30 |
| 11,453,375 B2 | 9/2022 | Hashimoto et al. | |
| 11,530,662 B2 | 12/2022 | Hashimoto et al. | |
| 11,603,111 B2 * | 3/2023 | Hashimoto | G06N 3/02 |
| 11,643,096 B2 | 5/2023 | Hashimoto et al. | |
| 11,654,915 B2 * | 5/2023 | Hashimoto | B60W 30/182 |
| | | | 701/23 |
| 2013/0210575 A1 | 8/2013 | Kumazaki et al. | |
| 2021/0114580 A1 | 4/2021 | Hashimoto et al. | |
| 2021/0190204 A1 * | 6/2021 | Hashimoto | G06N 20/00 |
| 2021/0403014 A1 * | 12/2021 | Bunazawa | B60K 6/445 |
| 2022/0018433 A1 * | 1/2022 | Bunazawa | F16H 61/30 |
| 2022/0034398 A1 * | 2/2022 | Fujii | F16H 61/061 |

FOREIGN PATENT DOCUMENTS

| | | |
|---|---|---|
| JP | H10-254505 A | 9/1998 |
| JP | 2000-250602 A | 9/2000 |
| JP | 2002-250602 A | 9/2002 |
| JP | 2007-064464 A | 3/2007 |
| JP | 2007-187300 A | 7/2007 |
| JP | 2008-025624 A | 2/2008 |
| JP | 6705540 B1 | 6/2020 |
| JP | 6705545 B1 | 6/2020 |
| JP | 6705547 B1 | 6/2020 |
| JP | 2021-067201 A | 4/2021 |
| JP | 2022-007029 A | 1/2022 |

OTHER PUBLICATIONS

Sep. 29, 2021 Notice of Allowance issued in U.S. Appl. No. 17/344,369.

* cited by examiner

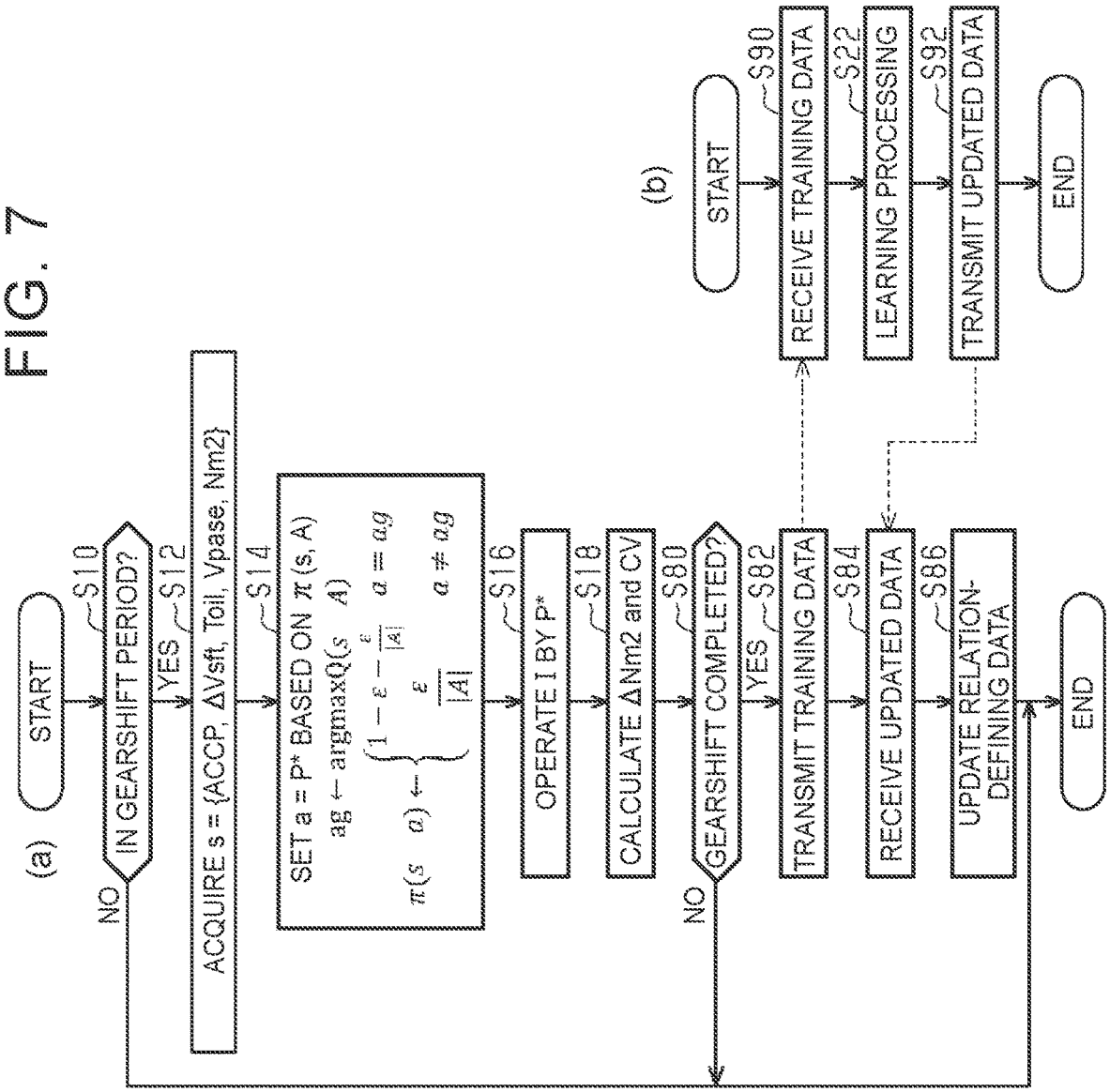

VEHICLE CONTROL DEVICE, VEHICLE CONTROL SYSTEM, VEHICLE LEARNING DEVICE, AND VEHICLE LEARNING METHOD

CROSS-REFERENCE TO RELATED APPLICATION

This application claims priority to Japanese Patent Application No. 2020-109677 filed on Jun. 25, 2020, incorporated herein by reference in its entirety.

BACKGROUND

1. Technical Field

The disclosure relates to a vehicle control device, a vehicle control system, a vehicle learning device, and a vehicle learning method.

2. Description of Related Art

Japanese Unexamined Patent Application Publication No. 2000-250602 (JP 2000-250602 A), for example, describes setting an appropriate gear ratio in accordance with the state of a vehicle by reinforcement learning.

SUMMARY

The inventors studied learning an operation amount for changing a gear ratio by reinforcement learning. However, when the search range is not narrowed down even though learning advances, the amount of time until reaching the optimal value may become long.

A vehicle control device according to a first aspect of the disclosure includes a processor and memory. The memory stores relation-defining data for defining a relation between a state of a vehicle and an action variable that is a variable relating to operations of a transmission installed in the vehicle. The processor is configured to execute acquisition processing of acquiring the state of the vehicle based on a detection value of a sensor, operation processing of operating the transmission based on a value of the action variable decided by the state of the vehicle acquired in the acquisition processing and the relation-defining data, reward calculation processing of giving a greater reward when characteristics of the vehicle satisfy a reference than when not satisfying the reference, based on the state of the vehicle acquired in the acquisition processing, updating processing of updating the relation-defining data, with the state of the vehicle acquired in the acquisition processing, the value of the action variable used in operation of the transmission, and the reward corresponding to the operation, as input to an updating map set in advance, counting processing of counting an update count by the updating processing, and limiting processing of limiting, toward being reduced, a range employed by the operation processing in which a value other than a value that maximizes an expected income regarding the reward, out of values of the action variable that the relation-defining data indicates, when the update count is great as compared to when small. The processor is configured to output the relation-defining data updated so that the expected income is increased when the transmission is operated following the relation-defining data, based on the updating map.

When reinforcement learning continues for a certain period, actions maximizing expected income that relation-defining data indicates near actions that actually increase income. Accordingly, indiscriminately continuing searching employing actions largely deviated from actions maximizing expected income that the relation-defining data indicates when the update count of the relation-defining data is large to a certain extent may result in processes being performed that are unnecessary toward bringing actions maximizing expected income that relation-defining data indicates nearer to actions that actually increase income. Accordingly, in the above configuration, when the update count is great, a range employing values other than values that maximize the expected income indicated by the relation-defining data is limited to toward being reduced, as compared to when small. In other words, the search range is limited toward being reduced. Accordingly, actions maximizing the expected income that the relation-defining data indicates can be brought near to actions that actually increase income at an early stage.

In the above aspect, the limiting processing may include processing of limiting an update amount in the updating processing toward being reduced when the update count is great, as compared to when small. When the update amount of relation-defining data based on a reward obtained by one search is constant, the period over which actions maximizing the expected income that the relation-defining data indicates change may become long. Accordingly, in the above configuration, the update amount is limited toward being reduced when the update count is great, thereby suppressing the relation-defining data from being greatly updated as a result of one search following advance in reinforcement learning. Accordingly, actions maximizing the expected income that the relation-defining data indicates can be brought near to actions that actually increase income at an early stage.

In the above aspect, the reward calculation processing may include processing of giving a greater reward when a heat generation amount in a gear ratio switching period is small as compared to when great, and processing of changing a magnitude of the reward given in accordance with a kind of gearshift even when the heat generation amount is the same.

There are various items requested when switching the gear ratio, and the degree of priority among a plurality of request elements may differ depending on the kind of gearshift. Accordingly, with regard to heat generation amount that is one of these request elements, when the magnitude of the reward is set to be the same for the same heat generation amount, regardless of the kind of gearshift, obtaining learning results that satisfy request elements with a high degree of priority may be difficult. Also, the degree of difficulty of satisfying each of the request elements at a predetermined standard may differ depending on the kind of gearshift. Accordingly, with regard to heat generation amount that is one of these request elements, when the magnitude of the reward is set to be the same for the same heat generation amount, regardless of the kind of gearshift, satisfying the request elements may become difficult. Accordingly, the above configuration changes rewards given regarding the same heat generation amount depending on the kind of gearshift, whereby the certainty of obtaining learning results that satisfy request elements with a high degree of priority can be raised, and learning can be advanced smoothly.

In the above aspect, the reward calculation processing may include processing of giving a greater reward when a gearshift time that is time required for switching the gear ratio is small as compared to when great, and processing of changing a magnitude of the reward given in accordance with a kind of gearshift even when the gearshift time is the same.

There are various items requested when switching the gear ratio, and the degree of priority among the request elements may differ depending on the kind of gearshift. Accordingly, with regard to gearshift time that is one of these request elements, when the magnitude of the reward is set to be the same for the same gearshift time, regardless of the kind of gearshift, obtaining learning results that satisfy request elements with a high degree of priority may be difficult. Also, the degree of difficulty of satisfying each of the request elements at a predetermined standard may differ depending on the kind of gearshift. Accordingly, with regard to gearshift time that is one of these request elements, when the magnitude of the reward is set to be the same for the same gearshift time, regardless of the kind of gearshift, satisfying the request elements may become difficult. Accordingly, the above configuration changes rewards given regarding the same gearshift time depending on the kind of gearshift, whereby the certainty of obtaining learning results that satisfy request elements with a high degree of priority can be raised, and learning can be advanced smoothly.

In the above aspect, the reward calculation processing may include processing of giving a greater reward when an overshoot amount of rotation speed of an input shaft of the transmission in a gear ratio switching period exceeding a reference rotation speed is small as compared to when great, and processing of changing a magnitude of the reward given in accordance with a kind of gearshift even when the overshoot amount is the same.

There are various items requested when switching the gear ratio, and the degree of priority among the request elements may differ depending on the kind of gearshift. Accordingly, with regard to overshoot amount that is one of these request elements, when the magnitude of the reward is set to be the same for the same exceeding amount, regardless of the kind of gearshift, obtaining learning results that satisfy request elements with a high degree of priority may be difficult. Also, the degree of difficulty of satisfying each of the request elements at a predetermined standard may differ depending on the kind of gearshift. Accordingly, with regard to overshoot amount that is one of these request elements, when the magnitude of the reward is set to be the same for the same overshoot amount, regardless of the kind of gearshift, satisfying the request elements may become difficult. Accordingly, the above configuration changes rewards given regarding the same overshoot amount depending on the kind of gearshift, whereby the certainty of obtaining learning results that satisfy request elements with a high degree of priority can be raised, and learning can be advanced smoothly.

In the above aspect, the reward calculation processing may include processing of giving a greater reward when a heat generation amount in a gear ratio switching period is small as compared to when great, and processing of changing a magnitude of the reward given in accordance with a magnitude of accelerator operation amount even when the heat generation amount is the same.

There are various items requested when switching the gear ratio, and the degree of priority among the request elements may differ depending on the magnitude of accelerator operation amount. Accordingly, with regard to heat generation amount that is one of these request elements, when the magnitude of the reward is set to be the same for the same heat generation amount, regardless of the magnitude of accelerator operation amount, obtaining learning results that satisfy request elements with a high degree of priority may be difficult. Also, the degree of difficulty of satisfying each of the request elements at a predetermined standard may differ depending on the accelerator operation amount. Accordingly, with regard to heat generation amount that is one of these request elements, when the magnitude of the reward is set to be the same for the same heat generation amount, regardless of the magnitude of accelerator operation amount, satisfying the request elements may become difficult. Accordingly, the above configuration changes rewards given regarding the same heat generation amount depending on the magnitude of accelerator operation amount, whereby the certainty of obtaining learning results that satisfy request elements with a high degree of priority can be raised, and learning can be advanced smoothly.

In the above aspect, the reward calculation processing may include processing of giving a greater reward when a gearshift time that is time required for switching the gear ratio is small as compared to when great, and processing of changing a magnitude of the reward given in accordance with a magnitude of accelerator operation amount even when the gearshift time is the same.

There are various items requested when switching the gear ratio, and the degree of priority among the request elements may differ depending on the magnitude of accelerator operation amount. Accordingly, with regard to gearshift time that is one of these request elements, when the magnitude of the reward is set to be the same for the same gearshift time, regardless of the magnitude of accelerator operation amount, obtaining learning results that satisfy request elements with a high degree of priority may be difficult. Also, the degree of difficulty of satisfying each of the request elements at a predetermined standard may differ depending on the accelerator operation amount. Accordingly, with regard to gearshift time that is one of these request elements, when the magnitude of the reward is set to be the same for the same gearshift time, regardless of the magnitude of accelerator operation amount, satisfying the request elements may become difficult. Accordingly, the above configuration changes rewards given regarding the same gearshift time depending on the magnitude of accelerator operation amount, whereby the certainty of obtaining learning results that satisfy request elements with a high degree of priority can be raised, and learning can be advanced smoothly.

In the above aspect, the reward calculation processing may include processing of giving a greater reward when an overshoot amount of rotation speed of an input shaft of the transmission in a gear ratio switching period exceeding a reference rotation speed is small as compared to when great, and processing of changing a magnitude of the reward given in accordance with a magnitude of accelerator operation amount even when the overshoot amount is the same.

There are various items requested when switching the gear ratio, and the degree of priority among the request elements may differ depending on the magnitude of accelerator operation amount. Accordingly, with regard to overshoot amount that is one of these request elements, when the magnitude of the reward is set to be the same for the same overshoot amount, regardless of the magnitude of accelerator operation amount, obtaining learning results that satisfy request elements with a high degree of priority may be difficult. Also, the degree of difficulty of satisfying each of the request elements at a predetermined standard may differ depending on the accelerator operation amount. Accordingly, with regard to overshoot amount that is one of these request elements, when the magnitude of the reward is set to be the same for the same overshoot amount, regardless of the accelerator operation amount, satisfying the request elements may become difficult. Accordingly, the above configuration changes rewards given regarding the same overshoot amount depending on the magnitude of accelerator operation amount, whereby the certainty of obtaining learning results that satisfy request elements with a high degree of priority can be raised, and learning can be advanced smoothly.

A vehicle control system according to a second aspect of the disclosure includes the processor and the memory of the vehicle control device according to the first aspect. The processor includes a first processor installed in the vehicle, and a second processor that is separate from an onboard device. The first processor is configured to execute at least the acquisition processing and the operation processing, and the second processor is configured to execute at least the updating processing.

According to the above configuration, the second processor executes updating processing, and accordingly computing load on the first processor can be reduced as compared to when the first processor executes the updating processing. Note that to say that the second processor is a separate device from an onboard device means that the second processor is not an onboard device.

A vehicle control device according to a third aspect of the disclosure includes the first processor of the vehicle control system of the above aspect.

A vehicle learning device according to a fourth aspect of the disclosure includes the second processor of the vehicle control system of the above aspect.

A vehicle learning method according to a fifth aspect of the disclosure includes causing a computer to execute the acquisition processing, the operation processing, the reward calculation processing, the updating processing, the counting processing, and the limiting processing of the above aspect.

According to the above method, advantages the same as those of the above aspect can be obtained.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a flowchart in which portion (a) and portion (b) show procedures for processing that the vehicle control system executes.

DETAILED DESCRIPTION OF EMBODIMENTS

First Embodiment

Figure 1:
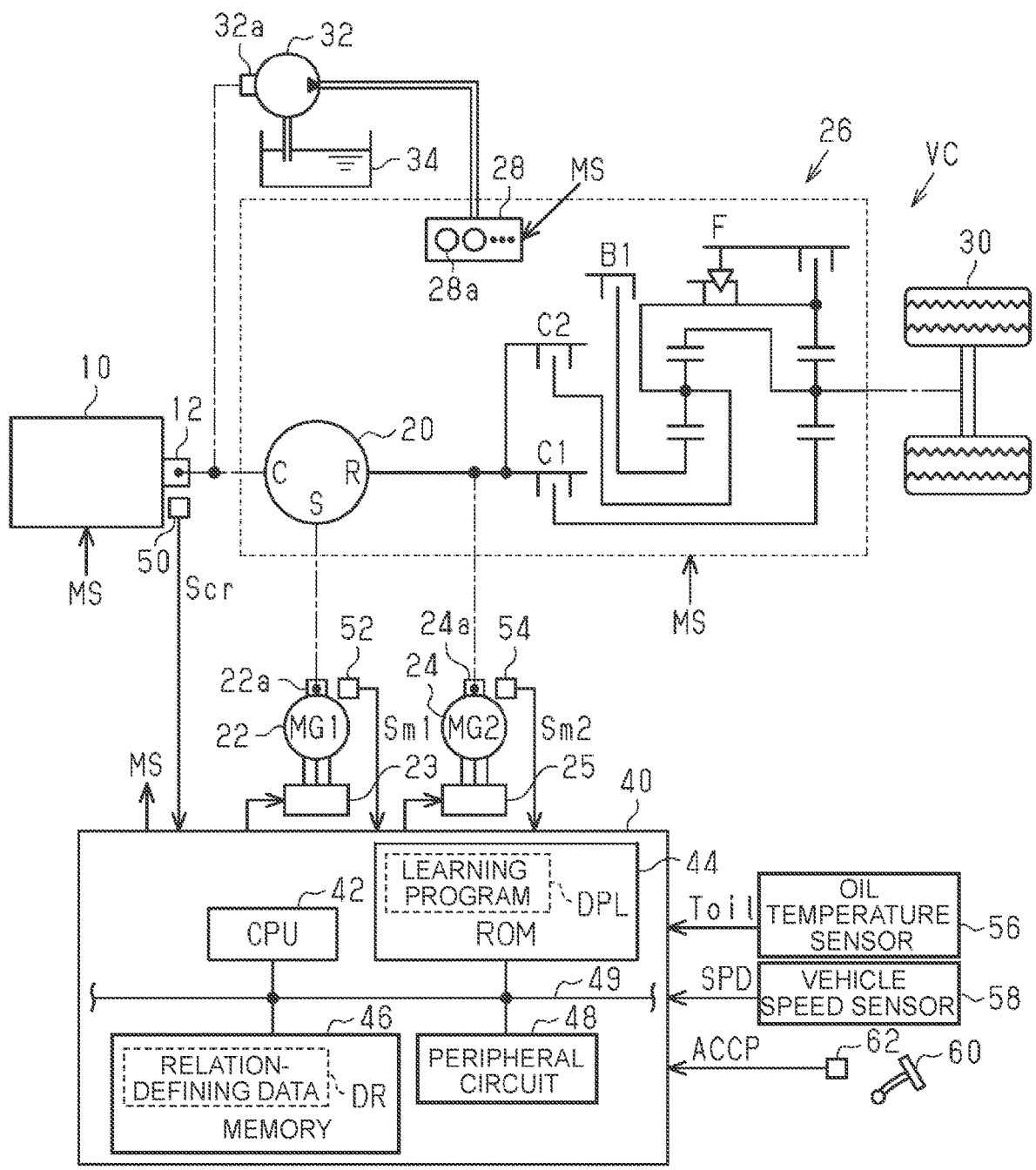
FIG. 1 is a diagram illustrating a control device and a drivetrain thereof according to a first embodiment.

A power split device 20 is mechanically linked to a crankshaft 12 of an internal combustion engine 10, as illustrated in FIG. 1. The power split device 20 splits power of the internal combustion engine 10, a first motor generator 22, and a second motor generator 24. The power split device 20 is provided with a planetary gear mechanism. The crankshaft 12 is mechanically linked to a carrier C of the planetary gear mechanism, a rotation shaft 22*a* of the first motor generator 22 is mechanically linked to a sun gear S thereof, and a rotation shaft 24*a* of the second motor generator 24 is mechanically linked to a ring gear R thereof. Output voltage of a first inverter 23 is applied to a terminal of the first motor generator 22. Also, output voltage of a second inverter 25 is applied to a terminal of the second motor generator 24.

In addition to the rotation shaft 24*a* of the second motor generator 24, drive wheels 30 are also mechanically linked to the ring gear R of the power split device 20 via a transmission 26. Also, a driven shaft 32*a* of an oil pump 32 is mechanically linked to the carrier C. The oil pump 32 is a pump that suctions oil within an oil pan 34 and discharges the oil into the transmission 26 as operating oil. Note that the operating oil discharged from the oil pump 32 is subjected to adjustment of the pressure thereof by a hydraulic pressure control circuit 28 within the transmission 26, and thus is used as operating oil. The hydraulic pressure control circuit 28 is provided with a plurality of solenoid valves 28*a*, and is a circuit that controls the state of the operating oil flowing and the hydraulic pressure of the operating oil by applying electricity to the solenoid valves 28*a*.

A control device 40 controls the internal combustion engine 10, and operates various types of operation portions of the internal combustion engine 10 to control torque, exhaust gas component ratio, and so forth, which are control amounts thereof. The control device 40 also controls the first motor generator 22, and operates the first inverter 23 to control torque, rotation speed, and so forth, which are control amounts thereof. The control device 40 also controls the second motor generator 24, and operates the second inverter 25 to control torque, rotation speed, and so forth, which are control amounts thereof.

When controlling the above control amounts, the control device 40 references an output signal Scr of a crank angle sensor 50, an output signal Sm1 of a first rotation angle sensor 52 that senses the rotation angle of the rotation shaft 22*a* of the first motor generator 22, and an output signal Sm2 of a second rotation angle sensor 54 that senses the rotation angle of the rotation shaft 24*a* of the second motor generator 24. The control device 40 also references oil temperature Toil that is the temperature of oil detected by an oil temperature sensor 56, vehicle speed SPD detected by a vehicle speed sensor 58, and an accelerator operation amount ACCP that is the amount of depression of an accelerator pedal 60, detected by an accelerator sensor 62.

The control device 40 is provided with a central processing unit (CPU) 42, read-only memory (ROM) 44, memory 46 that is electrically-rewritable nonvolatile memory, and a peripheral circuit 48, which are able to communicate via a local network 49. Now, the peripheral circuit 48 includes a circuit that generates clock signals to define internal operations, a power source circuit, a reset circuit, and so forth. The control device 40 controls the control amounts by the CPU 42 executing programs stored in the ROM 44.

Figure 2:
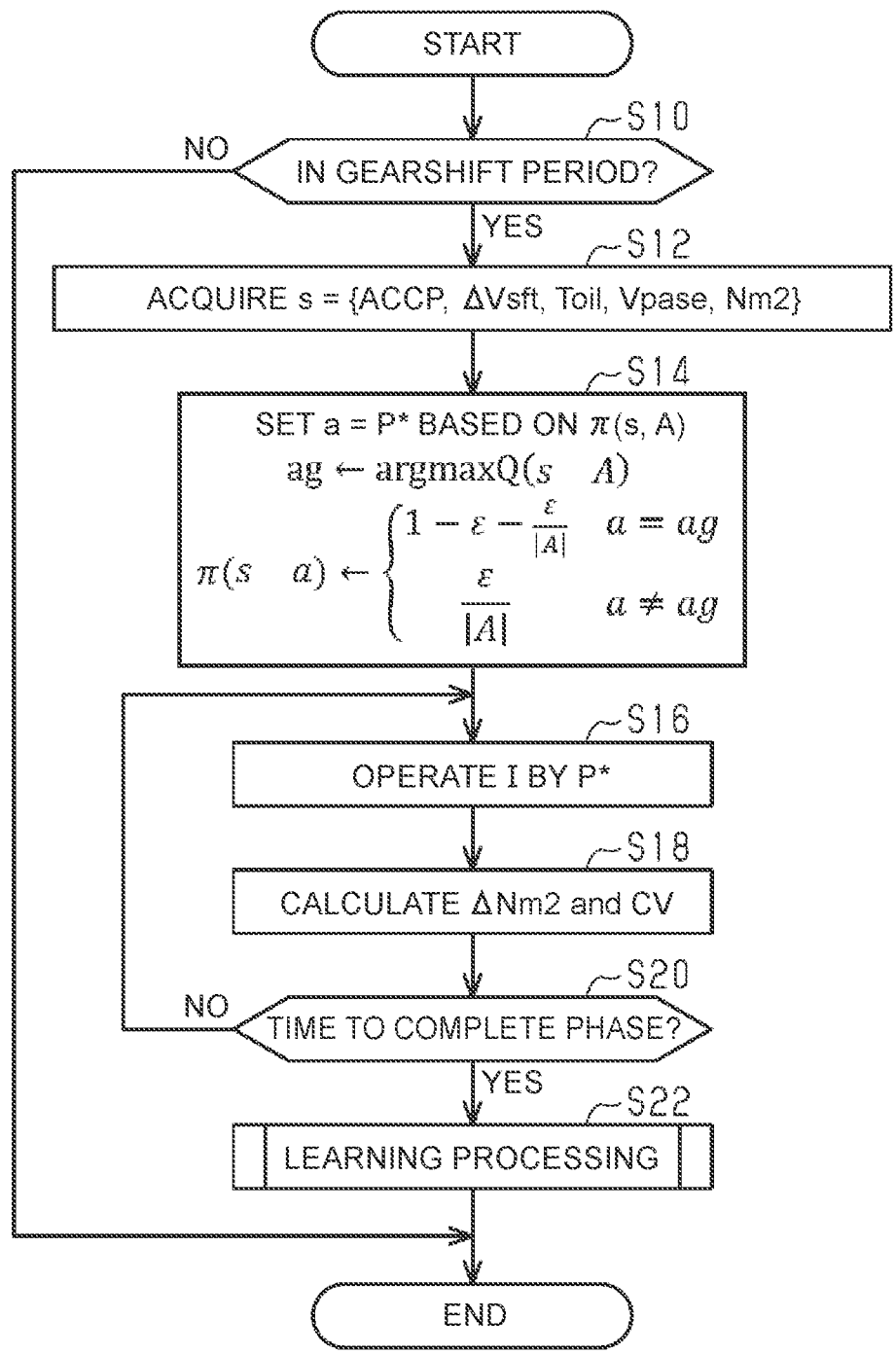
FIG. 2 is a flowchart showing procedures for processing that the control device according to the first embodiment executes.

FIG. 2 shows procedures of processing that the control device 40 executes. The processing shown in FIG. 2 is realized by a learning program DPL stored in the ROM 44 being repeatedly executed by the CPU 42 at a predetermined cycle, for example. Note that hereinafter, numerals following the letter "S" indicate step Nos. of each processing.

In the series of processing shown in FIG. 2, the CPU 42 first determines whether the current situation is a period in which switching of gear ratio is to be performed, i.e., whether the current situation is a gearshift period (S10). When determining currently to be a gearshift period (YES in S10), the CPU 42 acquires the accelerator operation amount ACCP, a gearshift variable ΔVsft, the oil temperature Toil, a phase variable Vpase, and a rotation speed Nm2 of the second motor generator 24, as a state s (S12). Note that the gearshift variable ΔVsft is a variable for identifying before switching gear ratios and after switching gear ratios, such as whether shifting from first gear to second gear, shifting from second gear to first gear, or the like. In other words, this is a variable for identifying the kind of gearshift. The phase variable Vpase is a variable for identifying which of three phases that determine stages of gearshift in a gearshift period the current situation is.

That is to say, in the present embodiment, a gearshift period is sectioned into phase 1, phase 2, and phase 3. Phase 1 here is a period from the time of starting gear ratio switching control up to an amount of time, set in advance, elapsing. Phase 2 is a period from the end time of phase 1 up to the end time of a torque phase. In other words, this is a period up to torque transmissibility reaching zero by friction engaging elements switching from an engaged state to a disengaged state due to switching of the gear ratio. The CPU 42 determines the end point of phase 2 based on deviation of actual input shaft rotation speed from an input shaft rotation speed determined by the rotation speed of an output shaft of the transmission 26 and the gear ratio before switching the gear ratio. The input shaft rotation speed may be rotation speed Nm2. Also, the CPU 42 calculates the output shaft rotation speed in accordance with the vehicle speed SPD. Phase 3 is a period from the end time of phase 2 up to completion of the gearshift. Note that the above rotation speed Nm2 is calculated by the CPU 42 based on the output signals Sm2.

The state s is values of variables regarding which the relation thereof with the action variable is defined by relation-defining data DR stored in the memory 46 illustrated in FIG. 1. Now, a hydraulic pressure command value of operating oil that drives the friction engaging elements involved in gear ratio switching will be exemplified in the present embodiment as an action variable. Specifically, with regard to phase 1 and phase 2, the hydraulic pressure command value is a constant value in these periods, and is a hydraulic pressure command value that rises at a constant rate in phase 3. Note that the action variable for phase 3 that is actually included in the relation-defining data DR may be a pressure rise rate.

Specifically, the relation-defining data DR includes an action value function Q. The action value function Q is a function in which the state s and an action a are independent variables, and expected income as to the state s and the action a is a dependent variable. In the present embodiment, the action value function Q is a function in a table format.

Next, the CPU 42 calculates the value of the action variable based on policy π defined by the relation-defining data DR (S14). In the present embodiment, an ε greedy policy is exemplified as the policy. That is to say, a policy is exemplified that determines a rule in which, when a state s is given, the largest action in the action value function Q at which an independent variable is the given state s (hereinafter referred to as greedy action ag) is selected with priority, while at the same time other actions are selected at a predetermined probability. Specifically, when the total number of values that the action can assume is expressed as "|A|", the probability of assuming an action other than that of the greedy action is each "ε/|A|".

Now, since the action value function Q is table format data in the present embodiment, the state s serving as an independent variable has a certain breadth. That is to say, when defining the action value function Q at 10% increments with regard to the accelerator operation amount ACCP, for example, the accelerator operation amount ACCP is not different states s when "3%" and when "6%" by that difference alone.

Next, the CPU 42 operates an applied electrical current I so that the applied electrical current I of the solenoid valves 28a assumes a value determined based on a hydraulic pressure command value P* (S16). The CPU 42 then calculates a rev amount ΔNm2 and a heat generation amount CV (S18).

The rev amount ΔNm2 is a quantification of the racing amount of the rotation speed of the input shaft of the transmission 26 during the gearshift period, and is calculated as an overshoot amount of rotation speed Nm2 as to rotation speed Nm2* that is a reference set in advance. The CPU 42 sets the reference rotation speed Nm2* in accordance with the accelerator operation amount ACCP, the vehicle speed SPD, and the gearshift variable ΔVsft. This processing can be realized by map computation of the reference rotation speed Nm2* by the CPU 42, in a state in which map data, in which the accelerator operation amount ACCP, the vehicle speed SPD, and the gearshift variable ΔVsft are input variables, and the reference rotation speed Nm2* is an output variable, is stored in the ROM 44 in advance. Note that map data is data of sets of discrete values of the input variables and values of the output variables corresponding to each of the values of the input variables. Map computation may also be performed in which, when a value of an input variable matches one of the values of the input variables in the map data, the corresponding value of the output variable in the map data is used as a computation result, and when there is no match, a value obtained by interpolation of a plurality of values of output variables included in the map data is used as a computation result, for example.

On the other hand, in the present embodiment, the heat generation amount CV is calculated as an amount proportional to a product of a rotation speed difference of a pair of friction engaging elements switching from one to the other of a disengaged state and an engaged state and torque applied thereto. In detail, the CPU 42 calculates the heat generation amount CV based on the rotation speed Nm2 that is the rotation speed of the input shaft of the transmission 26, the rotation speed of the output shaft of the transmission 26 found from the vehicle speed SPD, and torque found from the accelerator operation amount ACCP. Specifically, the CPU 42 performs map computation of the heat generation amount CV in a state in which map data, in which the rotation speed of the input shaft, the rotation speed of the output shaft, and the accelerator operation amount ACCP are input variables, and the heat generation amount CV is an output variable, is stored in the ROM 44 in advance.

The CPU 42 executes the processing of S16 and S18 until the current phase is completed (NO in S20). When determining that the current phase is to be completed (YES in S20), the CPU 42 updates the relation-defining data DR by reinforcement learning (S22).

Figure 3:
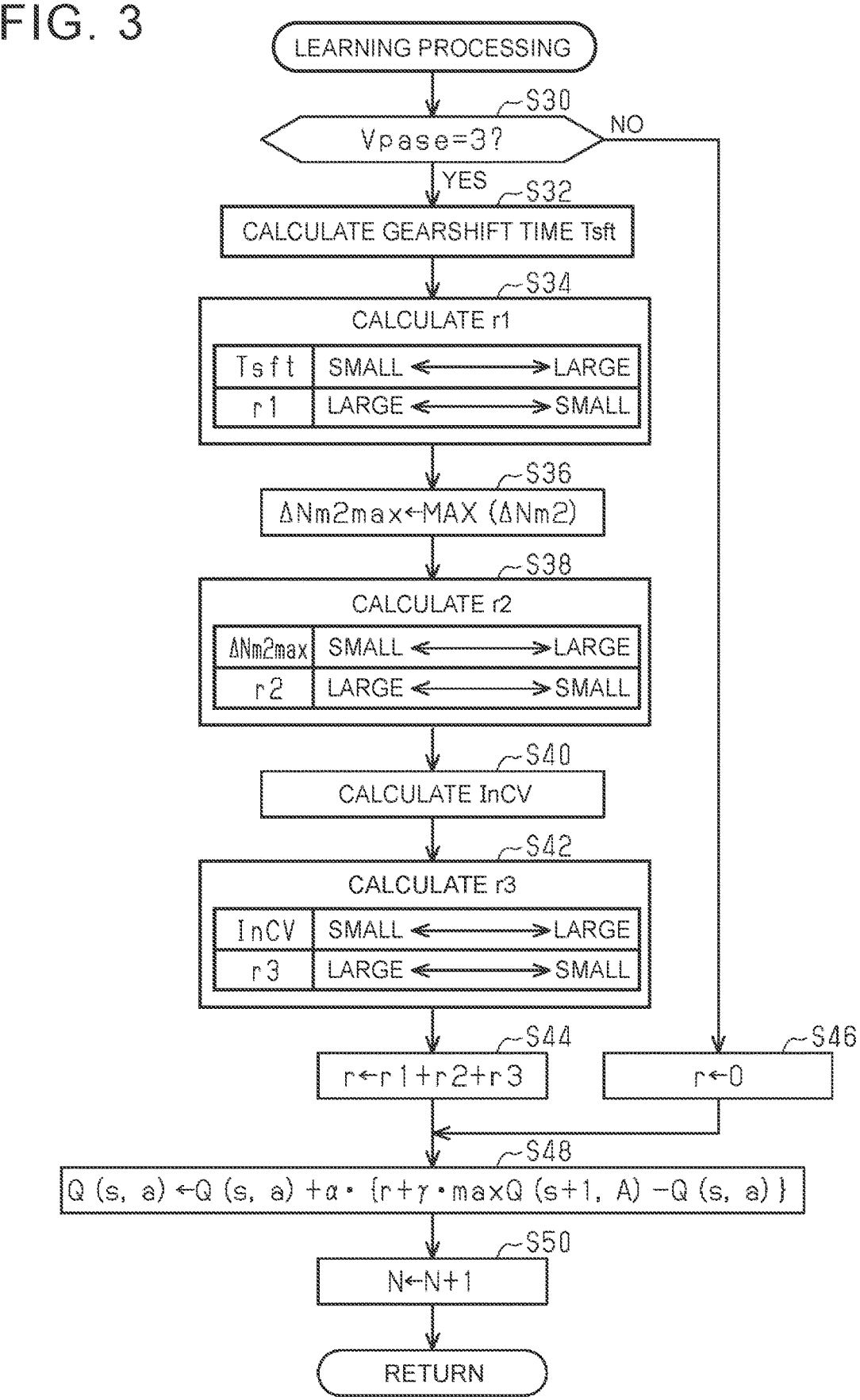
FIG. 3 is a flowchart showing detailed procedures for part of processing that the control device according to the first embodiment executes.

Note that when the processing of S22 is complete, or when a negative determination is made in the processing of S10, the CPU 42 ends the series of processing shown in FIG. 2 once. FIG. 3 illustrates the details of the processing of S22.

In the series of processing shown in FIG. 3, the CPU 42 first determines whether the phase variable Vpase is "3" (S30). When determining that the phase variable Vpase is "3" (YES in S30), the gearshift is complete, and accordingly the CPU 42 calculates a gearshift time Tsft that is the amount of time required for the gearshift (S32). The CPU 42 then calculates a reward r1 in accordance with the gearshift time Tsft (S34). More specifically, the CPU 42 calculates a larger value for the reward r1 when the gearshift time Tsft is small, as compared to when the gearshift time Tsft is large.

Next, the CPU 42 substitutes the largest value of the rev amount $\Delta Nm2$ repeatedly calculated at a predetermined cycle in the processing of S18, into a rev amount maximum value $\Delta Nm2max$ (S36). The CPU 42 then calculates a reward r2 in accordance with the rev amount maximum value $\Delta Nm2max$ (S38). More specifically, the CPU 42 calculates a larger value for the reward r2 when the rev amount maximum value $\Delta Nm2max$ is small, as compared to when the rev amount maximum value $\Delta Nm2max$ is large.

Next, the CPU 42 calculates a heat generation amount InCV that is an integrated value of the heat generation amount CV repeatedly calculated at the predetermined cycle by the processing in S18 (S40). Next, the CPU 42 calculates a reward r3 in accordance with the heat generation amount InCV (S42). Specifically, the CPU 42 calculates a larger value for the reward r3 when the heat generation amount InCV is small, as compared to when large.

The CPU 42 then substitutes the sum of the reward r1, the reward r2, and the reward r3 into the reward r for the action used in the processing of S16 (S44). On the other hand, when determining that the phase variable Vpase is "1" or "2" (NO in S30), the CPU 42 substitutes "0" into the reward r (S46).

When completing the processing of S44 or S46, the CPU 42 updates the action value function Q (s, a) used in the processing of S14 based on the reward r (S48). Note that the action value function Q (s, a) used in the processing of S14 is the action value function Q (s, a) that takes the state s acquired by the processing of S12 and the action a set by the processing of S14 as independent variables.

In the present embodiment, the action value function Q (s, a) is updated by so-called Q learning, which is policy-off temporal difference (TD) learning. Specifically, the action value function Q (s, a) is updated by the following Expression (c1).

$$Q(s,a) \leftarrow Q + \alpha \cdot \{r + \gamma \cdot \max Q(s+1, A) - Q(s,a)\} \quad (c1)$$

Here, discount rate $\gamma$ and learning rate $\alpha$ are used for the update amount "$\alpha \cdot \{r + \gamma \cdot \max Q(s+1, A) - Q(s,a)\}$" of the action value function Q (s, a). Note that the discount rate $\gamma$ and the learning rate $\alpha$ are both constants that are larger than "0" and no larger than "1". Also, when the current phase is phase 1 or 2, "maxQ (s+1, a)" means a state variable at the time of phase completion, i.e., the largest value of the action value function Q of which an independent variable is the state s to be acquired by the processing of S12 next time in the series of processing shown in FIG. 2, to which state s the value "1" is added. Note that unless the current phase is phase 3, the state s acquired by the processing of S12 next time in the series of processing shown in FIG. 2 is the state s, used in the processing of S48, to which the value "1" is added. Also, when the current phase is phase 3, the state s acquired by the processing of S12 this time in the series of processing shown in FIG. 2 is set to state s+1.

Next, the CPU 42 increments an update count N of the relation-defining data DR (S50). Note that when the processing of S50 is complete, the CPU 42 ends the series of processing shown in FIG. 3 once. Also note that the relation-defining data DR at the time of shipping a vehicle VC is data in which learning has been performed by processing similar to the processing in FIG. 2 in a prototype vehicle or the like of the same specifications as the vehicle VC. That is to say, the processing of FIG. 2 is processing to update the hydraulic pressure command value P* set before shipping the vehicle VC to a value that is appropriate for the vehicle VC to actually travel on the road, by reinforcement learning.

Figure 4:
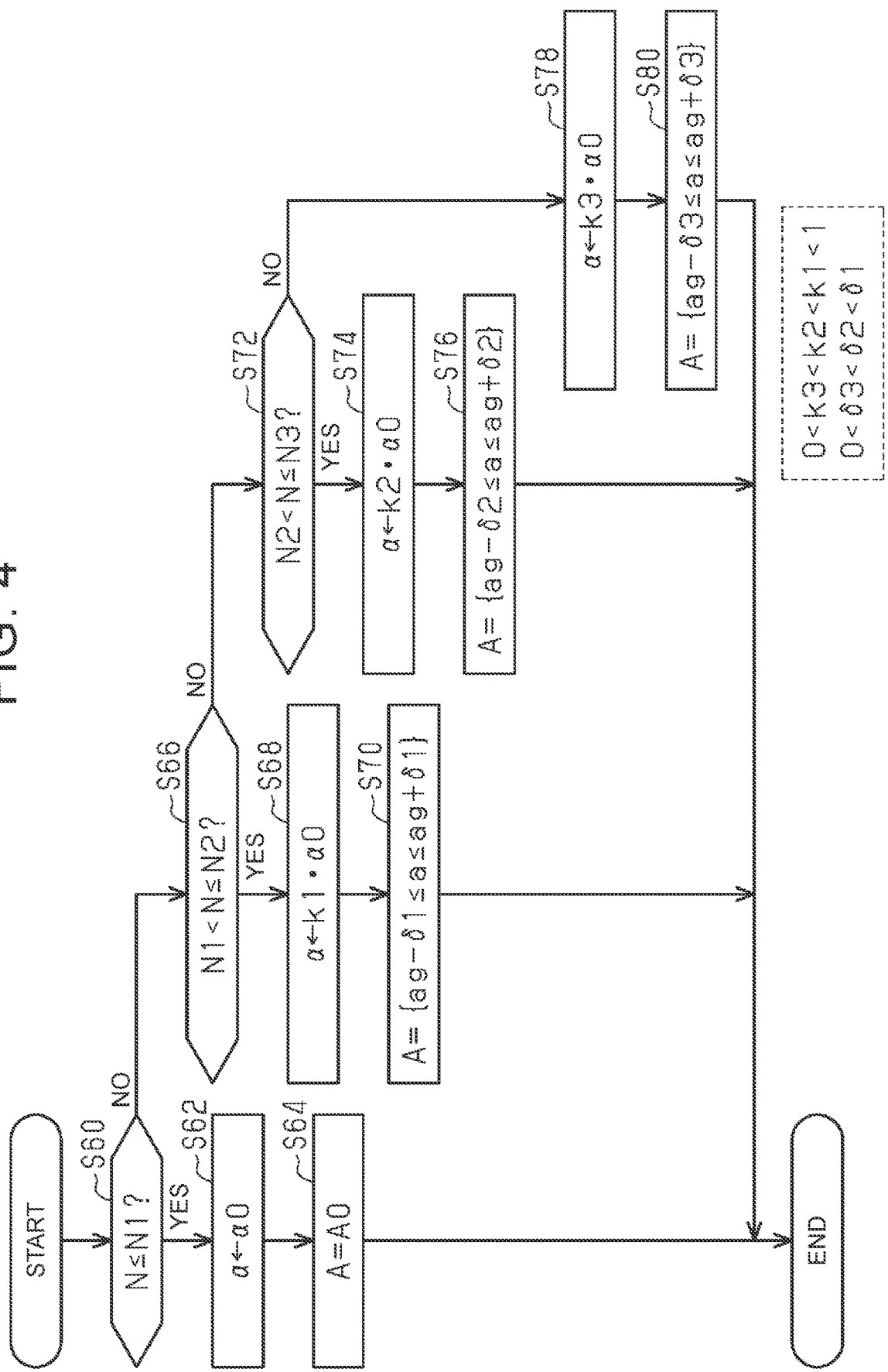
FIG. 4 is a flowchart showing procedures for processing that the control device according to the first embodiment executes.

FIG. 4 shows procedures for processing regarding setting a search range and the learning rate $\alpha$. The processing shown in FIG. 4 is realized by a program stored in the ROM 44 being repeatedly executed by the CPU 42 at a predetermined cycle, for example.

In the series of processing shown in FIG. 4 the CPU 42 first determines whether the update count N is no larger than a first predetermined value N1 (S60). The first predetermined value N1 is set to a count at which learning in accordance with the individual variability of the vehicle VC is presumed to have advanced a certain amount after shipping of the vehicle VC.

When determining that the update count N is no greater than the first predetermined value N1 (YES in S60), the CPU 42 substitutes an initial value $\alpha 0$ into the learning rate $\alpha$ (S62). The CPU 42 also sets an action range A used for searching to a broadest initial range A0 (S64). The initial range A0 permits a maximal amount of actions, under conditions that abnormal actions that would promote deterioration of the transmission 26 are eliminated.

On one hand, when determining that the update count N is greater than the first predetermined value N1 (NO in S60), the CPU 42 determines whether the update count N is no greater than a second predetermined value N2 (S66). The second predetermined value N2 is set to a value greater than the first predetermined value N1. When determining that the update count N is no greater than the second predetermined value N2 (YES in S66), the CPU 42 substitutes a value obtained by multiplying the initial value $\alpha 0$ by a correction coefficient k1 into the learning rate $\alpha$ (S68). The correction coefficient k1 here is a value that is greater than "0" and that is smaller than "1". Also, the CPU 42 limits the action range A used for searching to a range in which the difference as to the greedy action ag at the current point in time is no greater than a first prescribed value $\delta 1$ (S70). Note however, that this range is a range encompassed by the initial range A0.

On the other hand, when determining that the update count N is greater than the second predetermined value N2 (NO in S66), the CPU 42 determines whether the update count N is no greater than a third predetermined value N3 (S72). The third predetermined value N3 is set to a value greater than the second predetermined value N2. When determining that the update count N is no greater than the third predetermined value N3 (YES in S72), the CPU 42 substitutes a value obtained by multiplying the initial value $\alpha 0$ by a correction coefficient k2 into the learning rate $\alpha$ (S74). The correction coefficient k2 here is a value that is greater than "0" and that is smaller than the correction coefficient k1. Also, the CPU 42 limits the action range A used for searching to a range in which the difference as to the greedy action ag at the current point in time is no greater than a second prescribed value $\delta 2$ (S76). Note however, that the second prescribed value δ2 is smaller than the first prescribed value δ1. Also, this range is a range encompassed by the initial range A0.

On the other hand, when determining that the update count N is greater than the third predetermined value N3 (NO in S72), the CPU 42 substitutes a value obtained by multiplying the initial value α0 by a correction coefficient k3 into the learning rate α (S78). The correction coefficient k3 here is a value that is greater than "0" and that is smaller than the correction coefficient k2. Also, the CPU 42 limits the action range A used for searching to a range in which the difference as to the greedy action ag at the current point in time is no greater than a third prescribed value δ3 (S80). Note however, that the third prescribed value δ3 is smaller than the second prescribed value δ2. Also, this range is a range encompassed by the initial range A0.

Note that when the processing of S64, S70, S76, or S80 is complete, the CPU 42 ends the series of processing shown in FIG. 4 once. Effects and advantages of the present embodiment will be described here.

In a gearshift period, the CPU 42 selects a greedy action ag and operates applied electrical current for the solenoid valves 28a, while searching for a better hydraulic pressure command value P* using actions other than greedy actions, in accordance with a predetermined probability. The CPU 42 then updates the action value function Q used to determine the hydraulic pressure command value P* by Q learning. Accordingly, an appropriate hydraulic pressure command value P* when the vehicle VC is actually traveling can be learned by reinforcement learning.

Also, as the update count N of the relation-defining data DR becomes larger, the CPU 42 reduces the range of the action a for searching to a range that is not very far from the greedy action ag at that point in time. Now, it is conceivable that when the update count N becomes great, the greedy action ag that the relation-defining data DR indicates will approximate actions that actually increase income. Accordingly, reducing the search range enables performing searches actually employing actions that cannot be optimal values to be suppressed. Accordingly, the greedy action ag that the relation-defining data DR indicates can be brought near to actions that actually increase income at an early stage.

According to the present embodiment described above, the effects and advantages descripted below can further be obtained. (1) The learning rate α is changed to a smaller value as the update count N becomes larger. Accordingly, as the update count N becomes larger, the update amount of the relation-defining data DR can be limited to the small side. Moreover, this enables the relation-defining data DR, after reinforcement learning has advanced, to be suppressed from being greatly updated by the result of one search. Accordingly, the greedy action ag that the relation-defining data DR indicates can be brought near to actions that actually increase income at an early stage.

Second Embodiment

A second embodiment will be described below with reference to the drawings, primarily regarding points of difference from the first embodiment.

Figure 5:
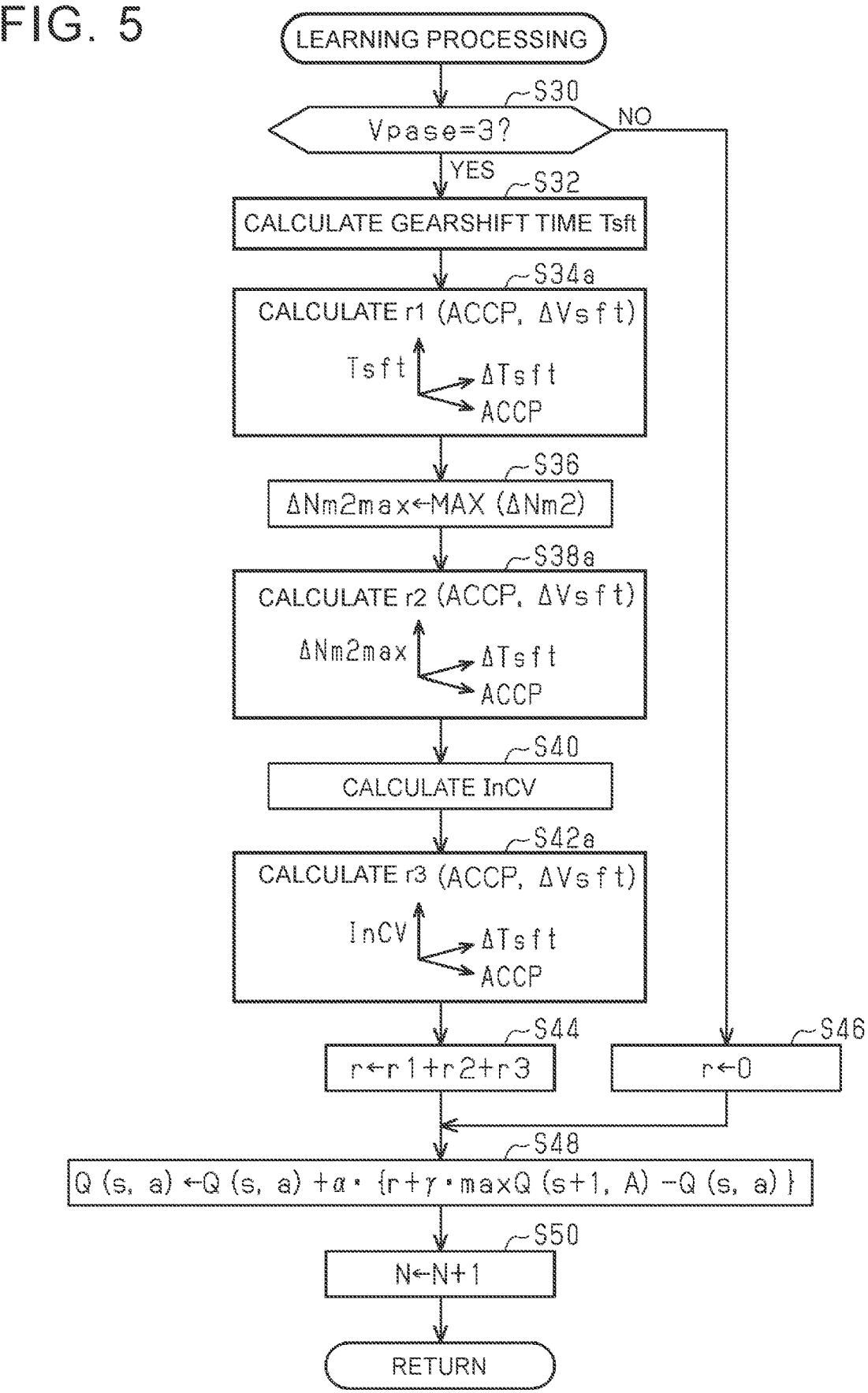
FIG. 5 is a flowchart showing procedures for processing that a control device according to a second embodiment executes.

FIG. 5 shows detailed procedures of the processing in S22, according to the present embodiment. The processing illustrated in FIG. 5 is realized by the CPU 42 executing the learning program DPL stored in the ROM 44.

In the series of processing shown in FIG. 5, the CPU 42 uses the accelerator operation amount ACCP and the gear-shift variable ΔVsft when performing calculation processing of the reward r1 in accordance with the gearshift time Tsft (S34a), calculation processing of the reward r2 in accordance with the rev amount maximum value ΔNm2max (S38a), and calculation processing of the reward r3 in accordance with the heat generation amount InCV (S42a).

The reason for giving rewards r1, r2, and r3 in accordance with the accelerator operation amount ACCP and the kind of gearshift here is as follows. Firstly, this is a setting to cause learning of greedy action ag with differing degrees of priority regarding three request elements of accelerator response that has a strong correlation with the gearshift time Tsft, drivability that has a strong correlation with the rev amount maximum value ΔNm2max, and heat generation amount InCV, in accordance with the accelerator operation amount ACCP and the gearshift variable ΔVsft.

That is to say, when the degree of priority for accelerator response is set to be higher for shifting from second gear to first gear than shifting from first gear to second gear, for example, the absolute value of the reward regarding the same gearshift time Tsft is set to be larger for shifting from second gear to first gear than shifting from first gear to second gear. In this case, the degree of priority for the heat generation amount InCV may be set to be high with regard to shifting from first gear to second gear, for example, thereby making the absolute value of the reward r3 regarding the same heat generation amount InCV to be greater as compared to when shifting from second gear to first gear.

Secondly, this is to differentiate the values that the rev amount maximum value ΔNm2max, the gearshift time Tsft, and the heat generation amount InCV can assume, in accordance with the accelerator operation amount ACCP and the kind of gearshift, since the torque and rotation speed applied to the transmission 26 differ in accordance with the accelerator operation amount ACCP and the kind of gearshift. Accordingly, there is a concern that giving the same identical reward r1 regarding the gearshift time Tsft or the like, regardless of the accelerator operation amount ACCP and the kind of gearshift, would make learning difficult.

Thus, in the present embodiment, making the rewards r1, r2, and r3 to be variable in accordance with the accelerator operation amount ACCP and the gearshift variable ΔVsft enables learning that reflects the difference in the degree of priority regarding the gearshift time Tsft, the rev amount ΔNm2, and the heat generation amount InCV, in accordance with the accelerator operation amount ACCP and the kind of gearshift. Also, rewards r1 through r3 can be given in light of the difference values that the rev amount maximum value ΔNm2max, the gearshift time Tsft, and the heat generation amount InCV can assume in accordance with the accelerator operation amount ACCP, leading to smooth advance of learning.

Third Embodiment

A third embodiment will be described below with reference to the drawings, primarily regarding points of difference from the first embodiment.

Figure 6:
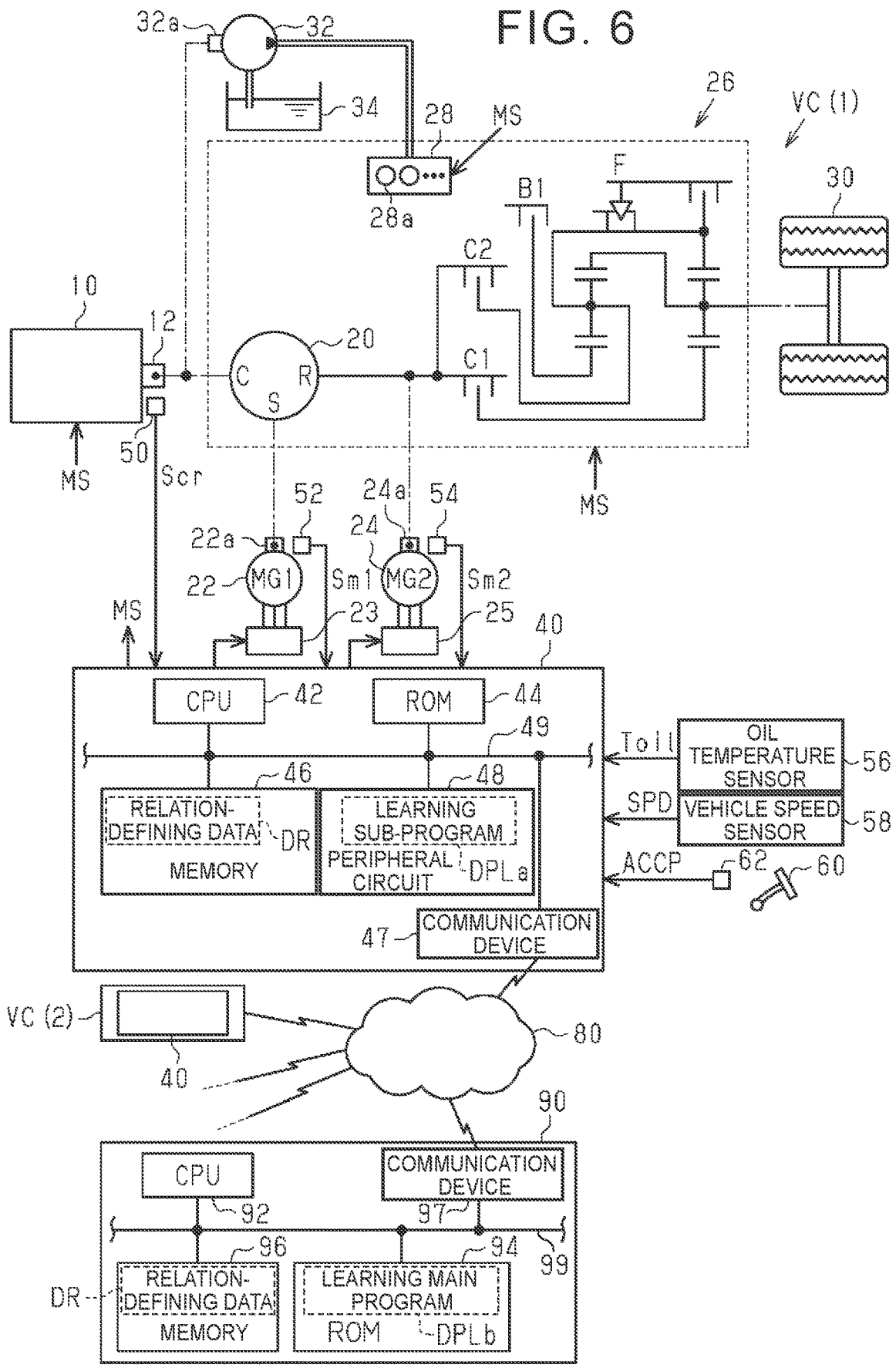
FIG. 6 is a diagram illustrating a configuration of a vehicle control system according to a third embodiment.

FIG. 6 illustrates a configuration of a system according to the present embodiment. Note that members in FIG. 6 that correspond to members illustrated in FIG. 1 are denoted by the same signs for sake of convenience, and description thereof will be omitted. The control device 40 of a vehicle VC(1) is provided with a communication device 47, and is able to communicate with a data analyzing center 90 via an external network 80 using the communication device 47, as illustrated in FIG. 6.

The data analyzing center 90 analyzes data transmitted from a plurality of vehicles VC(1), VC(2), and so on. The data analyzing center 90 is provided with a CPU 92, ROM 94, memory 96, and a communication device 97, which are able to communicate via a local network 99. Note that the memory 96 is an electrically-rewritable nonvolatile device, and stores the relation-defining data DR FIG. 7 shows processing procedures of reinforcement learning according to the present embodiment. Processing shown in the portion (a) in FIG. 7 is realized by the CPU 42 executing a learning sub-program DPLa stored in the ROM 44 illustrated in FIG. 6. Also, processing shown in the portion (b) in FIG. 7 is realized by the CPU 92 executing a learning main program DPLb stored in the ROM 94. Note that processing in FIG. 7 that corresponds to processing shown in FIG. 2 is denoted by the same step No., for sake of convenience. The processing shown in FIG. 7 will be described below following the time sequence of reinforcement learning.

In the series of processing shown in the portion (a) in FIG. 7, the CPU 42 of the control device 40 first executes the processing of S10 through S18, and then determines whether the gearshift is completed (S80). When determining that the gearshift is completed (YES in S80), the CPU 42 operates the communication device 97 and transmits data to be used for updating the relation-defining data DR by reinforcement learning to the vehicle VC, along with an identification code of the vehicle VC(1) (S82). This data contains the state s, the action a, the rev amount ΔNm2, the heat generation amount CV, and so forth.

In conjunction with this, the CPU 92 of the data analyzing center 90 receives the data for updating the relation-defining data DR (S90), as shown in the portion (b) in FIG. 7. Based on the received data, the CPU 92 then executes the processing of S22. The CPU 92 then operates the communication device 97 to transmit data for updating the relation-defining data DR to the transmission source of the data received by the processing of S90 (S92). Note that when completing the processing of S92, the CPU 92 ends the series of processing shown in the portion (b) in FIG. 7 once.

In response, the CPU 42 receives the data for updating, as shown in the portion (a) in FIG. 7 (S84). The CPU 42 then updates the relation-defining data DR used in the processing of S14, based on the received data (S86). Note that when completing the processing of S86, or when making a negative determination in the processing of S10 or S80, the CPU 42 ends the series of processing shown in the portion (a) in FIG. 7 once. Note that when making a negative determination in the processing of S80, and thereafter executing the series of processing shown in the portion (a) in FIG. 7 again, the CPU 42 does not newly update the action a by the processing of S12 through S16, except for when the current time is the time for phase start. That is to say, in this case, only the processing of S18 is newly executed.

In this way, the updating processing of the relation-defining data DR is performed externally from the vehicle VC1 according to the present embodiment, and accordingly the computation load on the control device 40 can be reduced. Further, by receiving data from the vehicles VC(1), VC(2), and so on in the processing of S90, and performing the processing of S22, for example, the count of data used for learning can be easily increased.

Correlative Relation

The correlative relation between the items in the above embodiment and the disclosure is as follows. A processor in the disclosure corresponds to the CPU 42 and the ROM 44, and memory corresponds to the memory 46. Acquisition processing corresponds to the processing of S12, S32, S36, and S40, and operation processing corresponds to the processing of S16. Reward calculation processing corresponds to processing of S34, S38, and S42 of FIG. 3, and processing of S34a, S38a, and S42a in FIG. 5. Updating processing corresponds to the processing of S48. Counting processing corresponds to the processing of S50, and limiting processing corresponds to processing of S64, S70, S76, and S80. An updating map corresponds to a map defined by commands of executing processing of S48 in the learning program DPL. In other words, an updating map corresponds to the map defined by the above Expression (c1). In the disclosure, limiting processing corresponds to the processing of S62, S68, S74, and S78. In the disclosure, a first processor corresponds to the CPU 42 and the ROM 44, and a second processor corresponds to the CPU 92 and the ROM 94. In the disclosure, a computer corresponds to the CPU 42 in FIG. 1, and the CPUs 42 and 92 in FIG. 6.

Other Embodiments

The present embodiment may be carried out altered as follows. Note that the present embodiment and the following modifications may be carried out in combination insofar as there is no technical contradiction.
Regarding State used for Selection of Value of Action Variable Based on Relation-Defining Data States used for selection of values of the action variable based on the relation-defining data are not limited to those exemplified in the above-described embodiments. For example, a state variable dependent on a previous action variable value regarding phase 2 and phase 3 is not limited to the rotation speed Nm2, and may be the rev amount ΔNm2, for example. The state variable may also be the amount of heat generated, for example. In the first place, a state variable dependent on a previous action variable value regarding phase 2 and phase 3 does not need to be included in the states used for selection of the value of the action variable, when using a profit-sharing algorithm or the like, as described later in the section "Regarding Updating Map", for example.

Including the accelerator operation amount ACCP in the state variable is not indispensable. Including the oil temperature Toil in the state variable is not indispensable. Including the phase variable Vpase in the state variable is not indispensable. For example, time from starting gearshift, rotation speed of input shaft, and gearshift variable ΔVsft may be included in the state variable, an action value function Q may be constructed that instructs actions every time, and reinforcement learning may be performed using this action value function. In this arrangement, the gearshift period is not specified to be three phases in advance.
Regarding Action Variable Although the action variable for phase 3 has been described as being pressure rise rate in the above embodiments, this is not limiting, and phase 3 may be further subdivided, and pressure command values at each stage may be the action variable, for example.

Although pressure command value or pressure rise rate is described as the action variable in the above embodiments, this is not limiting, and may be an instruction value of applied electrical current to the solenoid valves 28a, or rate of change of instruction value, for example.
Regarding Relation-Defining Data Although the action value function Q is described as a table-format function in the above embodiments, this is not limiting. For example, a function approximator may be used.

For example, instead of using the action value function Q, policy π may be expressed by a function approximator in which state s and action a are independent variables, and a probability of taking an action a is a dependent variable, and a parameter that sets the function approximator may be updated in accordance with the reward r.

Regarding Operating Processing

When the action value function Q is a function approximator, as described in the section "Regarding Relation-Defining Data", an action a that maximizes the action value function Q may be selected by inputting each of discrete values regarding actions that are independent variables of the table type function in the above embodiments, to the action value function Q along with the state s.

When the policy π is a function approximator in which state s and action a are independent variables, and a probability of taking an action a is a dependent variable, as described in the section "Regarding Relation-Defining Data", an action a may be selected based on a probability indicated by the policy π.

Regarding Updating Map

Although so-called Q learning, which is policy-off TD learning is exemplified regarding the processing of S48, this is not limiting. For example, learning may be performed using the so-called state-action-reward-state-action (SARSA) algorithm, which is policy-on TD learning. Moreover, learning is not limited to using TD, and the Monte Carlo method may be used, or eligibility traces may be used, for example.

A map following a profit-sharing algorithm, for example, may be used as the updating map for the relation-defining data based on reward. Specifically, for example, when an example of using a map following a profit-sharing algorithm is a modification of the processing exemplified in FIG. 2, the following may be carried out. That is to say, calculation of the reward is executed at the stage of completing the gearshift. The calculated reward is then distributed to rules determining each state-action pair involved in the gearshift, following a reinforcing function. A known geometric decreasing function, for example, may be used here as the reinforcing function. In particular, the gearshift time Tsft has a strong correlation with the value of the action variable in phase 3, and accordingly, when distributing the reward in accordance with the gearshift time Tsft, using a geometric decreasing function for a reinforcing function is effective, although this is not limited to a geometric decreasing function. For example, when giving a reward based on the amount of heat generated, the distribution of the reward in accordance with the amount of heat generated may be greatest for phase 1, in light of the strong correlation between the amount of heat generated and the value of the action variable in phase 1.

For example, when expressing the policy π using a function approximator as described in the section "Regarding Relation-Defining Data", and directly updating based on the reward r, an updating map may be configured using a policy gradient method.

The arrangement is not limited to just one of the action value function Q and the policy π being the object of direct updating by the reward r. For example, the action value function Q and the policy π may each be updated, as in an actor-critic method. Also, the actor-critic method is not limited to this, and a value function V may be the object of updating, instead of the action value function Q, for example.

Regarding Reward Calculating Processing

Although the reward r is zero in phase 1 and phase 2 in the above embodiments, this is not limiting. For example, in phase 1, a greater reward may be given when the heat generation amount CV is small in phase 1 as compared to when great. Also, for example, in phase 2, a greater reward may be given when the heat generation amount CV is small in phase 2 as compared to when great. Also, for example, in phase 2, a greater reward may be given when the rev amount $\Delta Nm2$ is small in phase 2 as compared to when great.

The processing of giving a greater reward when the heat generation amount is small as compared to when great is not limited to processing to giving a greater reward when the heat generation amount InCV is small as compared to when great. For example, a greater reward may be given when the greatest amount of the heat generation amount CV per time unit during the gearshift period is small as compared to when great.

The variable indicating an overshoot amount of the rotation speed of the input shaft of the transmission exceeding a reference rotation speed is not limited to the rev amount maximum value $\Delta Nm2max$, and may be an average value of the rev amount $\Delta Nm2$ during the gearshift period, for example. Also, for example, this may be a variable in which an overshoot amount exceeding a reference rotation speed of the input shaft when a gearshift command is issued is a reference is quantized.

Although processing of giving a larger reward when the gearshift time Tsft is short as compared to when long, processing of giving a larger reward when the overshoot amount is small as compared to when great, and processing of giving a larger reward when the heat generation amount InCV is small as compared to when great, are executed in the above embodiments, this is not limiting. Just one of these three may be executed, for example, or just two may be executed, for example.

Although description has been made regarding the processing in FIG. 5 that the magnitude of the reward r1 is changed in accordance with the accelerator operation amount ACCP and the kind of gearshift even though the gearshift time Tsft is the same, this is not limiting. For example, the reward r1 may be unchanged in accordance with the accelerator operation amount ACCP, and changed in accordance with the kind of gearshift. Alternatively, the reward r1 may be unchanged in accordance with the kind of gearshift, and changed in accordance with the accelerator operation amount ACCP, for example.

Although description has been made regarding the processing in FIG. 5 that the magnitude of the reward r2 is changed in accordance with the accelerator operation amount ACCP and the kind of gearshift even though the rev amount maximum value $\Delta Nm2max$ is the same, this is not limiting. For example, the reward r2 may be unchanged in accordance with the accelerator operation amount ACCP, and changed in accordance with the kind of gearshift. Alternatively, the reward r2 may be unchanged in accordance with the kind of gearshift, and changed in accordance with the accelerator operation amount ACCP, for example.

Although description has been made regarding the processing in FIG. 5 that the magnitude of the reward r3 is changed in accordance with the accelerator operation amount ACCP and the kind of gearshift even though the heat generation amount InCV is the same, this is not limiting. For example, the reward r3 may be unchanged in accordance with the accelerator operation amount ACCP, and changed in accordance with the kind of gearshift. Alternatively, the reward r3 may be unchanged in accordance with the kind of gearshift, and changed in accordance with the accelerator operation amount ACCP, for example.

Regarding Vehicle Control System

Processing of deciding action based on the policy π (processing of S14) is described as being executed at the vehicle side in the example shown in FIG. 7, but this is not limiting. For example, an arrangement may be made where data acquired by the processing of S12 is transmitted from the vehicle VC1, the data analyzing center 90 decides an action a using the data transmitted thereto, and transmits the decided action to the vehicle VC1.

The vehicle control system is not limited to being configured of the control device 40 and the data analyzing center 90. For example, a mobile terminal of a user may be used instead of the data analyzing center 90. Also, a vehicle control system may be configured from the control device 40, the data analyzing center 90, and the mobile terminal. This can be realized by executing processing of S14 by the mobile terminal, for example.

Regarding Processor

The processor is not limited to being provided with the CPU 42 (92) and the ROM 44 (94) and executing software processing. For example, a dedicated hardware circuit such as an application-specific integrated circuit (ASIC) or the like, for example, that performs hardware processing may be provided, to perform at least part of what is software processing in the above embodiments. That is to say, the processor may have a configuration that is one of the following (a) to (c). (a) A processing device that executes all of the above processing following a program, and program memory such as ROM or the like that stores the program, are provided. (b) A processing device that executes part of the above processing following a program and program memory, and a dedicated hardware circuit that executes the remaining processing, are provided. (c) A dedicated hardware circuit that executes all of the above processing is provided. A plurality of software processors each provided with a processing device and program memory, and a plurality of dedicated hardware circuits, may be provided here.

Regarding Computer

The computer is not limited to the CPU 42 in FIG. 1 and the CPUs 42 and 92 in FIG. 6. For example, the computer may be a computer for generating the relation-defining data DR before shipping the vehicle VC1, and the CPU 42 installed in the vehicle VC1. In this case, the search range after shipping is preferably a range in which the value that the action variable can assume is smaller in comparison with the search in the reinforcement learning executed by the computer for generating the relation-defining data DR. Note that an arrangement may be made in which, in the processing of generating the relation-defining data DR before shipping the vehicle, there is no vehicle and the state of the vehicle is artificially generated by running the internal combustion engine 10 and so forth on a test bench to simulate traveling of the vehicle, and detecting the artificially-generated state of the vehicle by sensor detection and so forth, to be used in reinforcement learning. In this case, the artificially-generated state of the vehicle is deemed to be the state of the vehicle based on detection values of sensors.

Regarding Memory

In the above embodiments, the memory storing the relation-defining data DR, and the memory (ROM 44, 94) storing the learning program DPL, the learning sub-program DPLa, and the learning main program DPLb, are described as being different memory, but this is not limiting.

Regarding Vehicle

The vehicle is not limited to a series-parallel hybrid vehicle, and may be a series hybrid vehicle or a parallel hybrid vehicle, for example. Note that the vehicle is not limited to a vehicle that is provided with an internal combustion engine and a motor generator as onboard rotating machines. For example, the vehicle may be a vehicle that is provided with an internal combustion engine but not provided with a motor generator, or for example, may be a vehicle that is provided with a motor generator but not provided with an internal combustion engine.

What is claimed is:

1. A vehicle control device, comprising:
a processor; and
memory, wherein
the memory stores relation-defining data for defining a relation between a state of a vehicle and an action variable that is a variable relating to operations of a transmission installed in the vehicle,
the processor is configured to execute
acquisition processing of acquiring the state of the vehicle based on a detection value of a sensor,
operation processing of operating the transmission based on a value of the action variable decided by the state of the vehicle acquired in the acquisition processing and the relation-defining data,
reward calculation processing of giving a greater reward when characteristics of the vehicle satisfy a reference than when not satisfying the reference, based on the state of the vehicle acquired in the acquisition processing,
updating processing of updating the relation-defining data, with the state of the vehicle acquired in the acquisition processing, the value of the action variable used in operation of the transmission, and the reward corresponding to the operation, as input to an updating map set in advance,
counting processing of counting an update count by the updating processing, and
limiting processing of limiting, toward being reduced, a range employed by the operation processing in which a value other than a value that maximizes an expected income regarding the reward, out of values of the action variable that the relation-defining data indicates, when the update count is great as compared to when small,
the processor is configured to output the relation-defining data updated so that the expected income is increased when the transmission is operated following the relation-defining data, based on the updating map, and
the limiting processing includes processing of limiting an update amount in the updating processing toward being reduced when the update count is great, as compared to when small.

2. The vehicle control device according to claim 1, wherein the reward calculation processing includes processing of giving a greater reward when a heat generation amount in a gear ratio switching period is small as compared to when great, and processing of changing a magnitude of the reward given in accordance with a kind of gearshift even when the heat generation amount is the same.

3. The vehicle control device according to claim 1, wherein the reward calculation processing includes processing of giving a greater reward when a gearshift time that is time required for switching the gear ratio is small as compared to when great, and processing of changing a magnitude of the reward given in accordance with a kind of gearshift even when the gearshift time is the same.

4. The vehicle control device according to claim 1, wherein the reward calculation processing includes processing of giving a greater reward when an overshoot amount of rotation speed of an input shaft of the transmission in a gear ratio switching period exceeding a reference rotation speed is small as compared to when great, and processing of changing a magnitude of the reward given in accordance with a kind of gearshift even when the overshoot amount is the same.

5. The vehicle control device according to claim 1, wherein the reward calculation processing includes processing of giving a greater reward when a heat generation amount in a gear ratio switching period is small as compared to when great, and processing of changing a magnitude of the reward given in accordance with a magnitude of accelerator operation amount even when the heat generation amount is the same.

6. The vehicle control device according to claim 1, wherein the reward calculation processing includes processing of giving a greater reward when a gearshift time that is time required for switching the gear ratio is small as compared to when great, and processing of changing a magnitude of the reward given in accordance with a magnitude of accelerator operation amount even when the gearshift time is the same.

7. The vehicle control device according to claim 1, wherein the reward calculation processing includes processing of giving a greater reward when an overshoot amount of rotation speed of an input shaft of the transmission in a gear ratio switching period exceeding a reference rotation speed is small as compared to when great, and processing of changing a magnitude of the reward given in accordance with a magnitude of accelerator operation amount even when the overshoot amount is the same.

8. A vehicle control system, comprising:
the processor and the memory of the vehicle control device according to claim 1, wherein
the processor includes a first processor installed in the vehicle, and a second processor that is separate from an onboard device, and
the first processor is configured to execute at least the acquisition processing and the operation processing, and the second processor is configured to execute at least the updating processing.

9. A vehicle learning method, comprising causing a computer to execute the acquisition processing, the operation processing, the reward calculation processing, the updating processing, the counting processing, and the limiting processing of the vehicle control device according to claim 1.

* * * * *